US009171155B2

(12) United States Patent
Romanenko et al.

(10) Patent No.: US 9,171,155 B2
(45) Date of Patent: Oct. 27, 2015

(54) SYSTEM AND METHOD FOR EVALUATING MALWARE DETECTION RULES

(71) Applicant: Kaspersky Lab ZAO, Moscow (RU)

(72) Inventors: Alexey M. Romanenko, Moscow (RU); Ilya O. Tolstikhin, Moscow (RU); Sergey V. Prokudin, Moscow (RU)

(73) Assignee: KASPERSKY LAB ZAO, Moscow (RU)

( * ) Notice: Subject to any disclaimer, the term of this patent is extended or adjusted under 35 U.S.C. 154(b) by 0 days.

(21) Appl. No.: 14/288,043

(22) Filed: May 27, 2014

(65) Prior Publication Data

US 2015/0096027 A1 Apr. 2, 2015

(30) Foreign Application Priority Data

Sep. 30, 2013 (RU) ................................ 2013143770

(51) Int. Cl.
| | |
|---|---|
| G06F 12/14 | (2006.01) |
| G06F 21/56 | (2013.01) |
| G06F 21/55 | (2013.01) |
| H04L 29/06 | (2006.01) |
| G06F 21/57 | (2013.01) |

(52) U.S. Cl.
CPC ............... *G06F 21/56* (2013.01); *G06F 21/55* (2013.01); *G06F 21/552* (2013.01); *G06F 21/577* (2013.01); *H04L 63/145* (2013.01); *H04L 63/1408* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 6,279,128 B1 * | 8/2001 | Arnold et al. | ................... 714/49 |
| 8,280,830 B2 | 10/2012 | Kennedy | |
| 8,356,354 B2 | 1/2013 | Nazarov | |

(Continued)

FOREIGN PATENT DOCUMENTS

| | | |
|---|---|---|
| EP | 2189920 | 5/2010 |
| WO | WO2007053708 | 5/2007 |

(Continued)

OTHER PUBLICATIONS

Plasse et al., "Combined use of association rules mining and clustering methods to find relevant links between binary rare attributes in a large data set", Elsevier. 2007.
Chaudhary et al., "Flow Classification Using Clustering and Association Rule Mining", North Carolina State University. Raleigh, USA. 2010.

(Continued)

*Primary Examiner* — Fatoumata Traore
(74) *Attorney, Agent, or Firm* — Patterson Thuente Pedersen, P.A.

(57) ABSTRACT

A malware detection rule is evaluated for effectiveness and accuracy. The detection rule defines criteria for distinguishing files having a characteristic of interest from other files lacking that characteristic, for instance, malicious files vs. benign files. The detection rule is applied to a set of unknown files. This produces a result set that contains files detected from among the set of unknown files as having the at least one characteristic of interest. Each file from the result set is compared to at least one file from a set of known files having the characteristic to produce a first measure of similarity, and to at least one file from a set of known files lacking the characteristic to produce a second measure of similarity. In response to the first measure of similarity exceeding a first similarity threshold, the detection rule is deemed effective. In response to the second measure of similarity exceeding a second similarity threshold, the detection rule is deemed inaccurate.

26 Claims, 6 Drawing Sheets

(56) References Cited

U.S. PATENT DOCUMENTS

| | | |
|---|---|---|
| 8,499,350 B1 | 7/2013 | Satish |
| 2009/0193293 A1 | 7/2009 | Stolfo et al. |
| 2010/0100963 A1 | 4/2010 | Mahaffey |
| 2010/0162395 A1 | 6/2010 | Kennedy |
| 2011/0047618 A1 | 2/2011 | Evans |
| 2011/0083187 A1* | 4/2011 | Malanov .................. 726/24 |
| 2011/0214161 A1 | 9/2011 | Stolfo |
| 2012/0066169 A1 | 3/2012 | Ghanadan |
| 2012/0167219 A1 | 6/2012 | Zaitsev |
| 2013/0198119 A1* | 8/2013 | Eberhardt et al. .............. 706/12 |
| 2013/0283382 A1* | 10/2013 | Kim et al. .................. 726/23 |

FOREIGN PATENT DOCUMENTS

| | | |
|---|---|---|
| WO | WO2008048665 | 4/2008 |
| WO | WO2013125867 | 8/2013 |

OTHER PUBLICATIONS

Perrizo et al., "Framework Unifying Association Rule Mining, Clustering and Classification", North Dakota State University. Fargo, ND. May 2002.

Aher et al., "Combination of Clustering, Classification and Association Rule based Approach for Course Recommender System in E-learning", International Journal of Computer Applications. vol. 39 Feb. 2012.

European Search Report for European Application No. 14176205 dated Dec. 11, 2014.

Blount et al., "Adaptive Rule-Based Malware Detection Employing Learning Classifier Systems: A Proof of Concept", Computer Software and Applications Conference Workshops. Jul. 18, 2011.

Shafiq et al., "On the Appropriateness of Evolutionary Rule Learning Algorithms for Malware Detection" Proceedings of the $11^{th}$ Annual Conference., Jan. 1, 2009.

* cited by examiner

SYSTEM AND METHOD FOR EVALUATING MALWARE DETECTION RULES

PRIOR APPLICATION

This application claims the benefit of Russian Federation Patent Application No. 2013143770 filed Sep. 30, 2013, incorporated by reference herein.

FIELD OF THE INVENTION

The invention relates generally to information processing and communications technologies and, more particularly, to computer-based technologies for assessing effectiveness and accuracy of detection rules, applicable to detection of malware, and other attributes found in sets of software objects.

BACKGROUND OF THE INVENTION

The scourge of malicious software is growing every hour. Antivirus companies must promptly and adequately react to these arising threats, but face many challenges. One such challenge involves striving for accuracy of malware detection. An adequate response to a threat involves the absence of false positives, i.e. the response must neutralize the threat but must not adversely affect benign files or other objects.

A response to a threat can involve creating a rule for detection of such threat and for its subsequent elimination. A detection rule, in a particular case, can be represented by signatures, heuristic rules or hash sums, i.e. methods which allow to detect target files from the whole variety of researched files. Once a rule is created, the rule is tested for absence of false activations. After the testing, the rule begins to function on the user side; quite often, a rule can be also additionally tested at the stage of its active functioning on the user side.

U.S. Pat. No. 8,280,830 discloses a system for modifying a detection rule based on preliminary testing of a created rule on a collection of safe files and malicious files. But a collection of safe files and malicious files available to antivirus software manufacturers cannot cover the entire variety of files encountered by users; therefore, quite often, feedback from the detection rule is used when it is already functioning on the user side. An antivirus application using a detection rule sends notices to developers, specifying which files activated the rule, and the developers analyze this information on their side. U.S. Pat. No. 8,356,354 discloses a system for issuing updates of antivirus databases; one of the embodiments provides that the antivirus application sends information to developers, specifying what files triggered the rule, and that the received information is analyzed for false activations of the rule.

But even the combined use of a collection of safe files and malicious files, with feedback from users, cannot guarantee the effectiveness of a detection rule because the collection is incomplete and because it is not possible to test the rule on files which will appear in the future, and also because not all users have antivirus software installed. Also, a significant drawback of the feedback method used today is that, generally, the file's checksum or hash, rather than the file itself, is used for the feedback, and if a file from the collection is even slightly different from the file which activated the rule, the checksums or hashes will not match and false activation will not be detected.

The probability of false activations increases in the case when the detection rule is created not for one file but for a group of similar files. In general, the larger the number of files for which the rule is being created, the higher the probability of false activation. Many of the known approaches have failed to take this fact into account.

An effective and practical solution is therefore needed to evaluate malware detection rules while avoiding false positives.

SUMMARY OF THE INVENTION

As discussed above, the problem of using over-inclusive detection rules (meaning that a malware detection rule detects not only a specific, known, piece of malware code, but also variations of that code) is the increased possibility of indicating false detections of malware from benign files. According to one aspect of the invention, this risk is managed by permitting the use of detection rules that are over-inclusive, and potentially imperfect.

Aspects of the invention can be realized in a computing system that includes a processor, data storage, and input/output devices including a network interface device, and an operating system.

A method for analyzing effectiveness and accuracy of a malware detection rule according to one embodiment includes obtaining the detection rule by the computing system. This can be achieved by receiving a remotely-generated detection rule, or locally generating the detection rule based on sets of known malicious and benign files. The detection rule defines criteria for distinguishing malicious files having at least one characteristic of interest from benign files lacking the at least one characteristic of interest.

The computing system applies the detection rule to a set of unknown files. Prior to the applying of the detection rule, the at least one characteristic of interest is initially undetermined for each file of the set of unknown files. As a result of the applying of the detection rule, a result set is generated that contains files detected from among the set of unknown files as having the at least one characteristic of interest.

The computing system compares each file from the result set to at least one file from a set of known malicious files to produce a first measure of similarity. Each file from the result set is also compared to at least one file from a set of known benign files to produce a second measure of similarity. In response to the first measure of similarity exceeding a first similarity threshold, the detection rule is deemed effective. In response to the second measure of similarity exceeding a second similarity threshold, the detection rule is deemed inaccurate.

In a related aspect of the invention, a system for analyzing effectiveness and accuracy of a malware detection rule is provided. The system includes computing hardware, including a processor, a data storage device, and input/output devices including a network interface device and a graphical user interface. The data storage device contains a set of unknown files to be analyzed for a presence of malware. The system further includes instructions executable on the computing hardware and stored in a non-transitory storage medium (which can be the data storage device or a separate device). When executed, the instructions cause the computing hardware to implement an check module and an analysis module.

The check module is configured to apply a detection rule to each of the files in the set of unknown files, with the detection rule being defined based on properties of known malicious files and on properties of known benign files. The detection rule defines criteria for distinguishing between the malicious files and the benign files. As a result of application of the detection rule, the check module is configured to produce a result set that contains files detected from among the set of unknown files as having characteristics associated with the known malicious files.

The analysis module configured to compare each file from the result set to at least one file from a set of the known malicious files to produce a first measure of similarity, and to at least one file from a set of the known benign files to produce a second measure of similarity. In response to the first measure of similarity exceeding a first similarity threshold, the detection rule is deemed effective; and in response to the second measure of similarity exceeding a second similarity threshold, the detection rule is deemed inaccurate.

In certain embodiments, the check module can take various actions to either trust the result set as having correctly ascertained the presence of malware in the set of unknown files, or perform further malware analysis on the result set to determine, with greater confidence, whether any items of the result set represent false positive malware determinations.

A variety of other advantages will become apparent from the following detailed description of the preferred embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

Figure 1A:
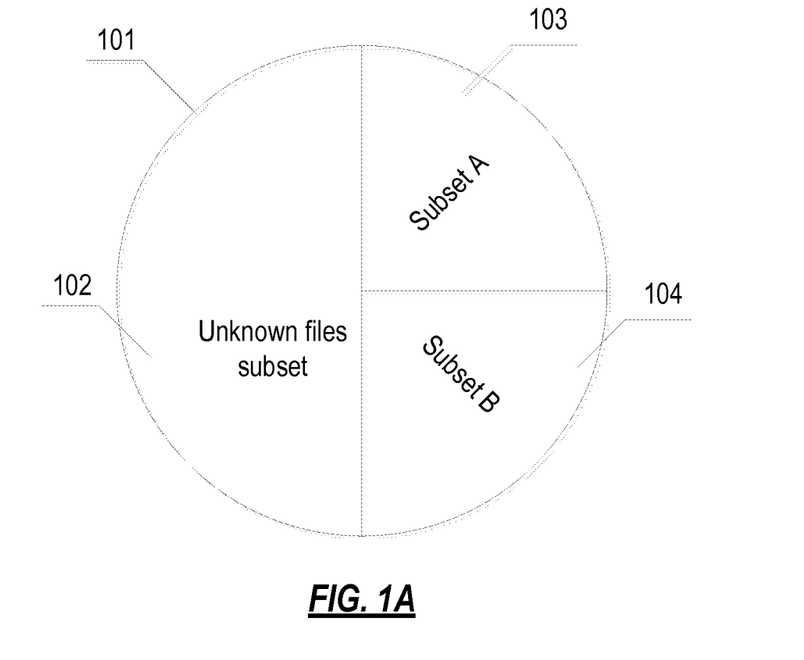
FIG. 1A is a diagram illustrating a relationship between a set of files and various subsets thereof, as utilized by certain embodiments of the invention.

FIG. 1A is a diagram illustrating a complete set of files 101, which includes a subset 102 of files that are unknown (in terms of the analysis of file characteristics to be performed), and subsets of files, subset A 103, and subset B 104 that contain files having known characteristics. In one embodiment, the characteristics subject to analysis relate to malware checking. Accordingly, in this embodiment, subset A 103 can contain files that are malicious, and subset B 204 can contain files that are deemed safe. A detection rule is defined to discriminate between subsets A and B. One aspect of the present invention is directed to checking the accuracy and effectiveness of the detection rule.

Figure 1B:
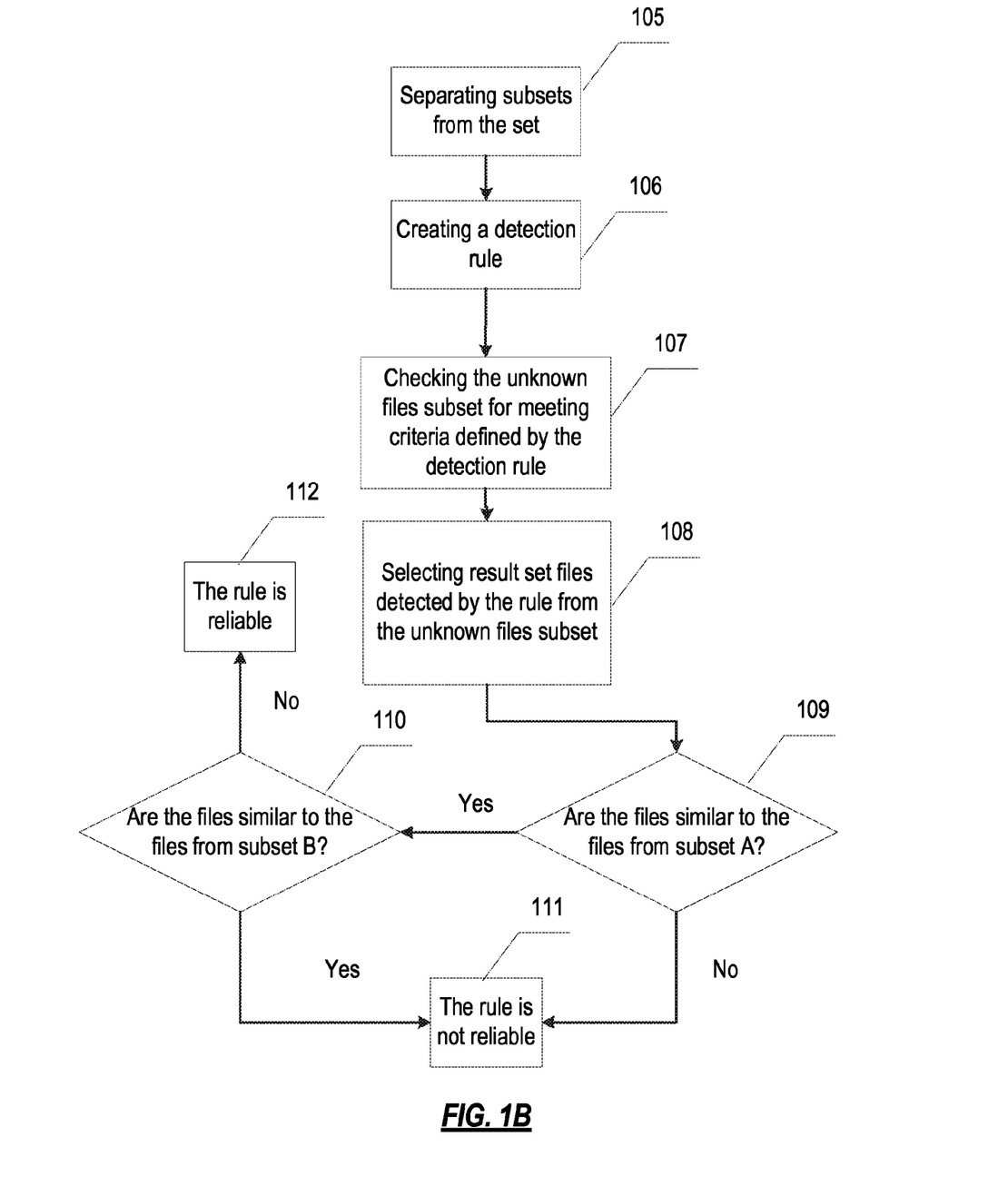
FIG. 1B is a flow diagram illustrating an exemplary method for determining effectiveness and accuracy of a detection rule according to one embodiment of the invention.

FIG. 1B is a flow diagram illustrating an exemplary method for determining effectiveness and accuracy of a detection rule according to one embodiment. This method is carried out automatically on a computer system, such as one described in greater detail below with reference to FIGS. 4 and 5.

The complete set of files 101, in one embodiment, includes all of the file types on a computer system. In related embodiments, set of files 101 is limited to files of a certain type, or to files stored in a certain location or path in the computer system's file system.

A subset of known files is identified in this set. In this context, the known files are files for which a characteristic of interest (e.g., maliciousness) has been determined. The files of the set which do not belong to the subset of known files are considered to be the unknown files subset 102. Using the known characteristic of interest, the subset of known files is divided into at least two subsets: subset A 103 and subset B 104. This separation is performed at block 105. For example, such subsets can be subsets of malicious and benign files (the distinguishing characteristic being the maliciousness (e.g., risk score) associated with each file). For a characteristic that has a range of values (e.g., a numerical score having many potential values), one or more criteria are applied to categorize each score into a corresponding binary value (e.g., using a thresholding comparison) according to one type of embodiment so that the known files can be categorized into subset A 103 and subset B 104.

In related embodiments, the distinguishing characteristic differentiates between executable and non-executable files (the criterion being the method of use), script files and portable-executable (PE) format files (the criterion being the file type), etc. Also, for separation purposes, multiple characteristics can be used, and a subset can be grouped based on files meeting criteria requiring multiple characteristics at the same time (e.g., executable files that are malicious, contrasted with files that are benign or non-executable).

From subset A 103 of the known files subset, a group of representative files is selected, and for this group of representative files, at 106, a detection rule is created. The detection rule, in one embodiment, represents a logical mechanism that defines criteria (e.g., in terms of a combination of file characteristics) to distinguish relevant files (i.e., those having the distinguishing characteristic(s) of interest) from files that lack the distinguishing characteristic. Files from the unknown files subset 102 are checked for meeting the criteria defined by the detection rule at 107. This checking is performed by the computer system operating under program control according to one embodiment.

Before recognizing a rule to be effective (i.e., capable of identifying files meeting the detection criteria) and accurate (i.e., not returning false positives), the rule is tested for these qualities according to aspects of the invention. Effectiveness of a detection rule is a performance measure representing the absence of errors of a first kind during the rule's operation; accuracy of a detection rule means the absence of errors of a second kind. Errors of the first kind relate to failure of the detection rule to detect a file on which the detection criteria defined by the rule should have been activated. Errors of the second kind relate to satisfaction of the detection criteria of the rule by a file that should not have been activated. This testing is performed at 108 by first applying the detection rule to files of the unknown files subset 102. This operation produces a result set of detected files.

The result set consists of files from the subset of unknown files 102 that satisfied the criteria of the detection rule. These result set files are separately identified from the remainder of unknown files subset 102. The files of the result set are used to determine the accuracy of the detection rule.

In order to perform this testing according to one embodiment, properties of the files in the result set are obtained. In one embodiment, for portable-executable (PE)-format files, such properties include: the file size, the file image size, the number of file sections, the API (application programming interface) functions of the file, the RVA (Related Virtual Address) of file sections, the RVA of the entry point, respective location of directory table objects, frequency characteristics of the symbols (including printed symbols), the set of file strings and their quantity, the information entropy of the start and the end of the section, the virtual size of the section, the physical size of the section, the compiler used to create the file, the subsystem type (NATIVE, WINDOWS_GUI, WINDOWS_CUI, OS2_CUI, POSIX_CUI, NATIVE_WINDOWS, WINDOWS_CE_GUI), the properties of the file from the COFF (Common Object File Format) header, the location of directory table objects by file sections, etc. In a related embodiment, the file properties common among the files of the result set are represented in the form of a differentiating rule, which is different from the detection rule being evaluated.

In one embodiment, the obtained properties are used to determine if the detection rule is effective by checking if the properties of the result set files are similar to one or more files of subset A 103. Also, the properties are used to determine if the detection rule is accurate by checking if the result set files are dissimilar from the files of subset B 104. In so doing, a further assessment can be made as to the uniformity among the files of the result set.

Accordingly, the result set files are compared to at least one file from subset A 103 at 109; in one embodiment, such a file from subset A can be one of the files based upon which the detection rule was created. In another embodiment, the one or more files from subset A used for the file comparison is different from the file or files used to create the detection rule. In a related embodiment, multiple comparisons are made to different files from subset A 103, for each file of the result set. The files selected from subset A 103 for this purpose can be specifically selected to represent a diversity of files—i.e., files of various type or format, files located in different paths in the file system, files of various ages, files corresponding to different application programs, etc.

In one embodiment, this comparison is made in order to (a) evaluate the uniformity of files which met the detection criteria defined by the detection rule, and (b) to determine the similarity of the result set files to the files from subset A 103.

Then, at 110, the result set files are compared with the files from subset B 104, in order to check for overlap, if any, between the result set files with files from subset B. One set, or optionally, different combinations, of file properties are used to make these comparisons according to one embodiment. Also, in a related embodiment, the selected files from subset B 104 to be checked against the result set are selected to be diverse, in similar fashion to the files selected from subset A to be used for comparison to the result set.

If, based on the results of the comparison, the result set files are found to be similar to files from subset A 103 and not similar to files from subset B 104, the detection rule is recognized as being accurate, as indicated at 112. If the result set files are not similar to the files from subset A, or if the result set files are similar to the files from subset B, the detection rule is recognized to be unreliable at Stage 111.

When being compared, files are considered to be similar if the degree of similarity between the files exceeds a specified threshold. In one embodiment, the degree of similarity between files is determined based on the degree of similarity between certain file properties, with different file properties given different weights for the comparison. In one embodiment, the degree of similarity between files is determined based on the degree of similarity between the data stored in the files.

In another embodiment, the degree of similarity between the files is determined based on the degree of similarity between the files' functionality. A log of calls for API functions of the operating system during file execution emulation can be used as a definition of the file's functionality.

Various measures of similarity can be used according to contemplated embodiments. The degree of similarity can be determined using Dice's distance, for example. In other embodiments, the degree of similarity is determined using one of the following distances: Hamming, Levenstein, Jaccard. In a related embodiment, combinations of distance measures can be applied.

Figure 2:
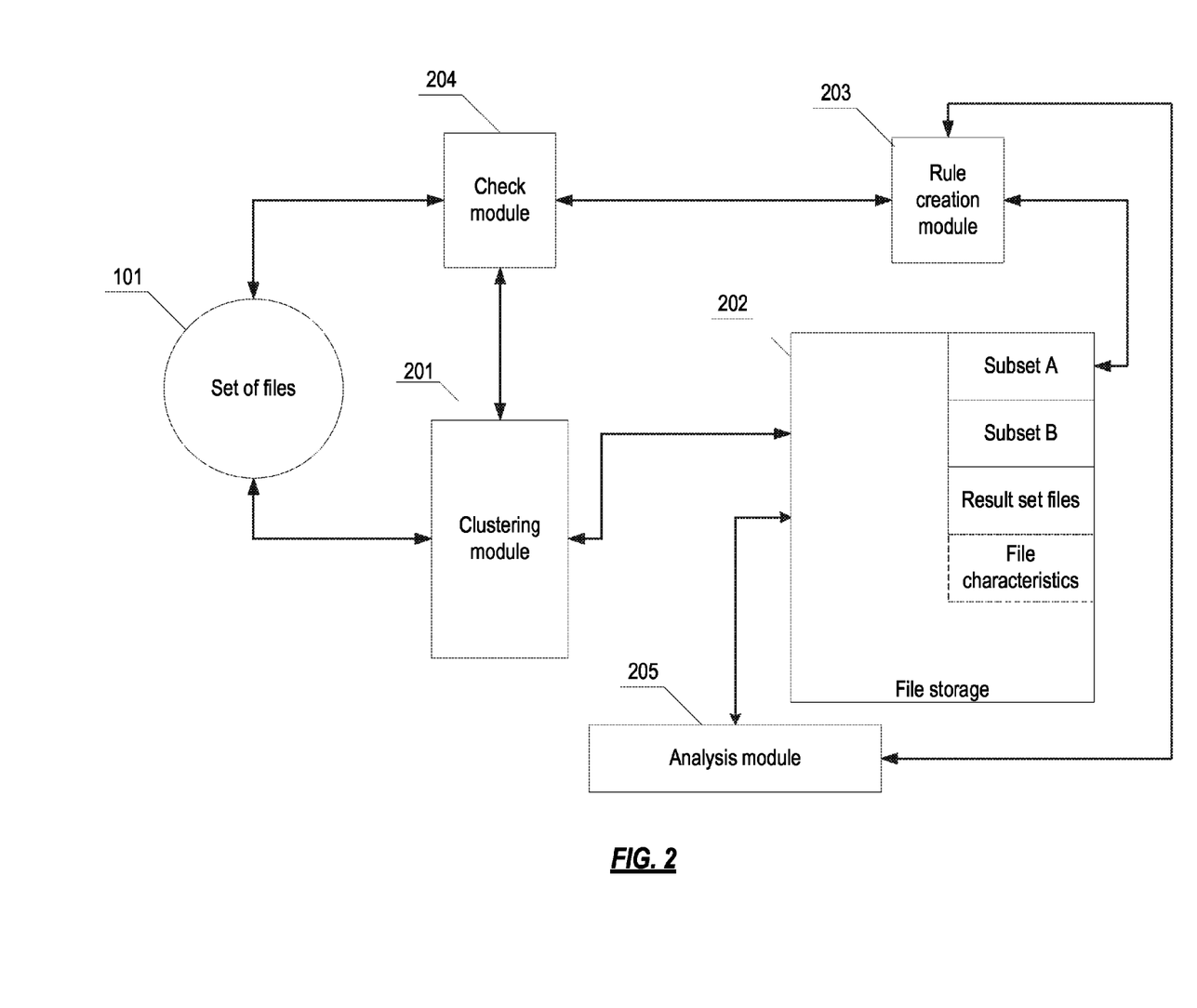
FIG. 2 is a block diagram illustrating a computer-based system for testing the effectiveness and accuracy of a detection rule according to one embodiment.

FIG. 2 is a block diagram illustrating a computer-based system for testing the effectiveness and accuracy of a detection rule according to a related aspect of the invention. The exemplary system is constructed to carry out the method described above with reference to FIG. 1B. The system includes various modules, each of which is constructed, configured, or otherwise adapted, to carry out a function or set of functions. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cluster, peer-peer, cloud, etc.) processing where appropriate, or other such techniques. Accordingly, each module can be realized in a variety of suitable configurations, and should generally not be limited to any particular implementation exemplified herein, unless such limitations are expressly called out. In addition, a module can itself be composed of more than one sub-modules, each of which can be regarded as a module in its own right. Moreover, in the embodiments described herein, each of the various modules corresponds to a defined functionality; however, it should be understood that in other contemplated embodiments, each functionality may be distributed to more than one module. Likewise, in other contemplated embodiments, multiple defined functionalities may be implemented by a single module that performs those multiple functions, possibly alongside other functions, or distributed differently among a set of modules than specifically illustrated in the examples herein.

In the exemplary system, a clustering module 201 is given access to the set of files 101. Clustering module 201 is programmed or otherwise configured to perform the separation of the subset A 103 and of the subset B 104 from the set of files 101 using one or more selected separation criteria (e.g., known state of maliciousness, etc.) and, in one embodiment, collects the values or ranges of values of relevant file characteristics that are distinct among the files in each of the subsets A and B, 103 and 104, respectively.

The separated file subsets are saved in file storage 202. Rule creation module 203 is programmed or otherwise configured to generate a detection rule based on a group of files from subset A. In one embodiment, the group of files is the entire subset A; in another embodiment, the group of files is a part of subset A. In the latter example, the part of subset A can be N randomly-selected files, where N is a predefined limit.

The created rule is passed to the check module 204, which is programmed or otherwise configured to apply the generated rule to each of the files in the subset of unknown files 102. Accordingly, the check module 204 produces a result set of files which were detected by the detection rule. In one embodiment, the result set is passed to the clustering module 201, which proceeds to save copies of the result set files in the file storage 202.

The analysis module 205 is programmed or otherwise configured to compare the result set files with one or more of the files belonging to each of subset A and subset B, which can include at least one file used in the creation of the detection rule in the first place. Then, the analysis module 205 checks the accuracy of the detection rule based on the performed comparison. If, as a result of the comparison, the result set files are found to be dissimilar to any file from subset B and similar to the files for which the detection rule was created, the analysis module deems the detection rule to be accurate as well as effective.

In a related embodiment, the clustering module 201 is further used to extract file characteristics from the result set, and to store those characteristics in file storage 202.

In another related embodiment, the analysis module 205, in order to compare files, determines the degree of similarity between files based on the degree of similarity between file characteristics or on functionality, consistent with the method described above.

Figure 3:
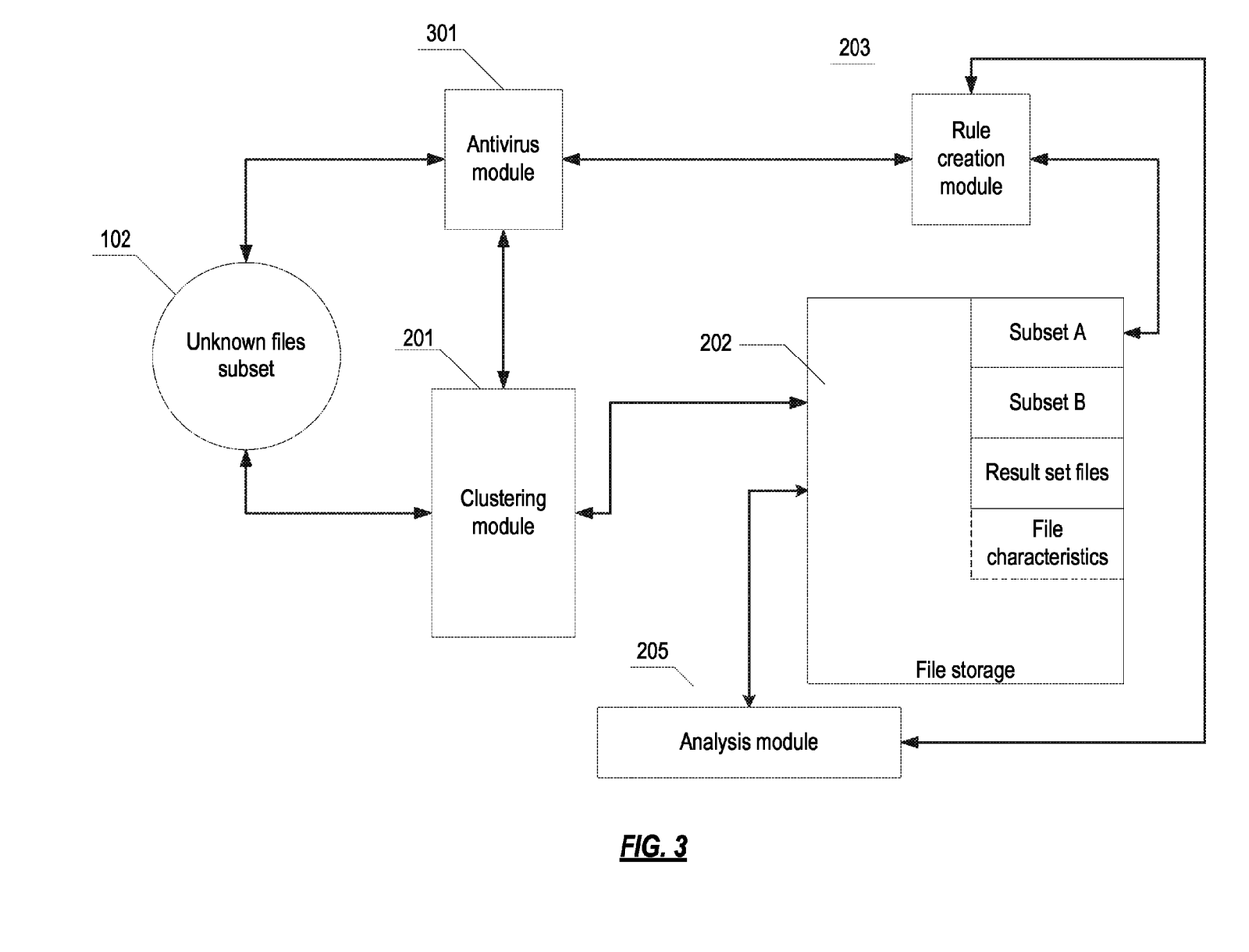
FIG. 3 is a diagram illustrating a system for checking the accuracy of a detection rule particularly for detecting malicious software according to a related embodiment.

FIG. 3 is a diagram illustrating a system for checking the accuracy of a detection rule particularly for detecting malicious software. This example system is similar to the more general system described in connection with FIG. 2 above, except that an antivirus module 301 is used in place of check module 204. Also, the set of files, and subsets thereof, can be defined somewhat differently: referring to FIG. 1A, the set of files 101 can include files stored on a user's local computer system, as well as optionally files stored on the computer systems of other users, and additionally, files store in the "cloud," e.g., on a server operated by an antivirus service provider. For instance, the subset of unknown files 102 can be stored on a user's local computer system. The subsets A and B, 103 and 104, respectively, can correspond to known malicious and known benign files, and these may be stored at the antivirus service provider.

The set of files involved in the checking of the rule includes a subset of malicious files and a subset of benign files. From the subset of malicious files, i.e., subset A 103, some files are selected for creation of a detection rule. For example, this can be files from one family of malicious software, files packaged by the same packager (in this case, the use of the particular packager is typical only for malicious files), etc. The detection rule creation module 203 creates a detection rule for the selected files. In one embodiment, the detection rule creation module 203 is operated by the antivirus service provider.

The detection rule is used in the operation of the antivirus module 301. The rule creation module 203 sends, to the antivirus module 301, a rule for checking a subset of unknown files. The subset of unknown files can be stored in a local file storage device, or can be distributed over remote storage units—for example, user personal computers. The antivirus module 301 checks the subset of unknown files for meeting the detection criteria defined by the detection rule. The antivirus module 301 sends, to the clustering module 201, information indicating the files which met the detection criteria. These are the result set files in the present example.

The clustering module 201 separates the result set files and saves them in the file storage 202. The clustering module 201 also extracts the characteristics of the separated files. Then, the analysis module 205 compares the result set files against one or more files from the malicious files subset, determining the degrees of similarity of the characteristics of the files being compared.

In one embodiment, such files are selected from the malicious files subset for comparison for which the detection rule was created. For the files being compared, the analysis module 205 calculates the degree of similarity of the selected characteristics; if the degree of similarity exceeds a preset threshold, the files are considered to be similar.

If all result set files are considered similar to the files from the malicious files subset, the analysis module continues the comparison, comparing the separated files to the benign files subset. In one such embodiment, the combination of file characteristics used for comparison is different from the combination used when comparing the result set files with the files from the malicious files subset.

If, as a result of the comparison, none of the separated files is found to be similar to any file from the safe files subset, the analysis module 205 recognizes the detection rule being tested as accurate.

In a related aspect of the invention, the system depicted in FIG. 3 is used in connection with a malware detection technique in which rules are purposefully designed to be over-inclusive, meaning that a malware detection rule detects not only a specific, known, piece of malware code, but also variations of that code. As discussed above, the problem of using over-inclusive detection rules is the increased possibility of indicating false detections of malware from benign files. Accordingly, this aspect of the invention involves managing this risk by permitting detection rules that are over-inclusive, and potentially imperfect, to be released to antivirus programs running on client computer systems belonging to users. Using a system according to the embodiments described above, the files in the file system of each user's computer system are evaluated against the over-inclusive detection rules.

On each user's computer system, the result set produced by application of the detection rules is evaluated to determine the effectiveness and accuracy of the rule. This evaluation can be performed on the client side (i.e., at the user's computer system as part of the operation of the antivirus application program), at the antivirus service provider's side, or by some combination thereof with certain processing being performed by an assigned party.

In response to the detection rule being found to be effective and accurate, the result set will reflect files deemed malicious, and protective action can be called for to secure the user's computer system from these files.

In response to the detection rule being found to be not effective but accurate (in other words, some malware is missed but no false positives were recorded), the result set can be treated by protective action, and the antivirus service provider can be notified that a more inclusive rule is to be generated.

In response to the detection rule being found to be effective but inaccurate, the result set may be subjected to further analysis, such as using emulation or other more computationally-expensive technique, to better ascertain the true risk associated with each item in the result set.

In response to the detection rule being found to be neither effective nor accurate, the result set may be disregarded as being unreliable or, alternatively, in a more cautious approach, the result set can be quarantined and subjected to further analysis to ensure the safety of those files. Also, the antivirus service provider can be notified about the lack of effectiveness of the detection rule, which will prompt the antivirus service provider to create a more inclusive, or better, rule.

Figure 4:
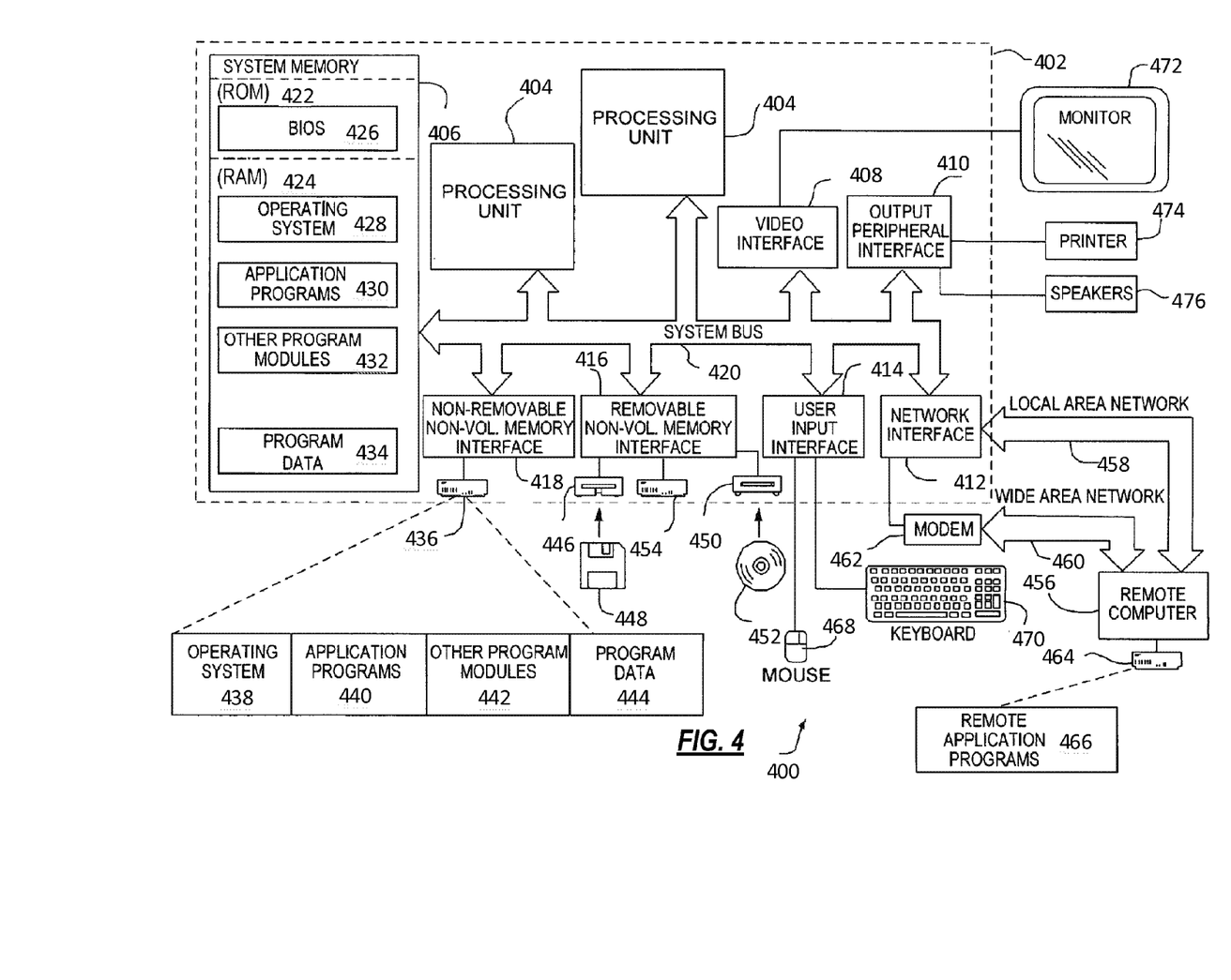
FIG. 4 is a diagram illustrating a general-purpose computer system on which aspects of the invention may be implemented.

FIG. 4 is a diagram illustrating in greater detail a computer system 400 on which aspects of the invention as described herein may be implemented according to various embodiments. The computer system 400 may include a computing device such as a personal computer 402. The personal computer 402 includes one or more processing units 404, a system memory 406, a video interface 408, an output peripheral interface 410, a network interface 412, a user input interface 414, removable 416 and non-removable 418 memory interfaces and a system bus or high-speed communications channel 420 coupling the various components. In various embodiments, the processing units 404 may have multiple logical cores that are able to process information stored on computer readable media such as the system memory 406 or memory attached to the removable 416 and non-removable 418 memory interfaces 418. The computer 402 system memory 406 may include non-volatile memory such as Read Only Memory (ROM) 422 or volatile memory such as Random Access Memory (RAM) 424. The ROM 422 may include a basic input/output system (BIOS) 426 to help communicate with the other portion of the computer 402. The RAM 424 may store portions of various software applications such as the operating system 428, application programs 430 and other program modules 432. Further, the RAM 424 may store other information such as program or application data 434. In various embodiments, the RAM 424 stores information that requires low-latencies and efficient access, such as programs and data being manipulated or operated on. In various embodiments RAM 424 comprises Double Data Rate (DDR) memory, Error Correcting memory (ECC) or other memory technologies with varying latencies and configurations such as RAMBUS or DDR2 and DDR3. In this way, in various embodiments, the system memory 406 may store the input data store, access credential data store, operating memory data store, instruction set data store, analysis result data store and the operating memory data store. Further, in various embodiments, the processing units 404 may be configured to execute instructions that limit access to the aforementioned data stores by requiring access credential before access to the information is granted.

The removable 416 and non-removable 418 memory interfaces may couple the computer 402 to disk drives 436 such as SSD or rotational disk drives. These disk drives 436 may provide further storage for various software applications such as the operating system 438, application programs 440 and other program modules 442. Further, the disk drives 436 may store other information such as program or application data 444. In various embodiments, the disk drives 436 store information that doesn't require the same low-latencies as in other storage mediums. Further, the operating system 438, application program 440 data, program modules 442 and program or application data 444 may be the same information as that stored in the RAM 424 in various embodiments mentioned above or it may be different data potentially derivative of the RAM 424 stored data.

Further, the removable non-volatile memory interface 416 may couple the computer 402 to magnetic portable disk drives 446 that utilize magnetic media such as the floppy disk 448, Iomega® Zip or Jazz, or optical disk drives 450 that utilize optical media 452 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 402 may utilize the network interface 412 to communicate with one or more remote computers 456 over a local area network (LAN) 458 or a wide area network (WAN) 460. The network interface 412 may utilize a Network Interface Card (NIC) or other interface such as a modem 462 to enable communication. The modem 462 may enable communication over telephone lines, coaxial, fiber optic, powerline, or wirelessly. The remote computer 456 may contain a similar hardware and software configuration or may have a memory 464 that contains remote application programs 466 that may provide additional computer readable instructions to the computer 402. In various embodiments, the remote computer memory 464 can be utilized to store information such as identified file information that may be later downloaded to local system memory 406. Further, in various embodiments the remote computer 456 may be an application server, an administrative server, client computers, or a network appliance.

A user may enter information to the computer 402 using input devices connected to the user input interface 414 such as a mouse 468 and keyboard 470. Additionally, the input device may be a trackpad, fingerprint scanner, joystick, barcode scanner, media scanner or the like. The video interface 408 may provide visual information to a display such as a monitor 472. The video interface 408 may be an embedded interface or it may be a discrete interface. Further, the computer may utilize a plurality of video interfaces 408, network interfaces 412 and removable 416 and non-removable 418 interfaces in order to increase the flexibility in operation of the computer 402. Further, various embodiments utilize several monitors 472 and several video interfaces 408 to vary the performance and capabilities of the computer 402. Other computer interfaces may be included in computer 402 such as the output peripheral interface 410. This interface may be coupled to a printer 474 or speakers 476 or other peripherals to provide additional functionality to the computer 402.

Various alternative configurations and implementations of the computer 402 are within the spirit of the invention. These variations may include, without limitation, additional interfaces coupled to the system bus 420 such as universal serial bus (USB), printer port, game port, PCI bus, PCI Express or integrations of the various components described above into chipset components such as the northbridge or southbridge. For example, in various embodiments, the processing unit 404 may include an embedded memory controller (not shown) to enable more efficient transfer of data from the system memory 406 than the system bus 420 may provide.

Figure 5:
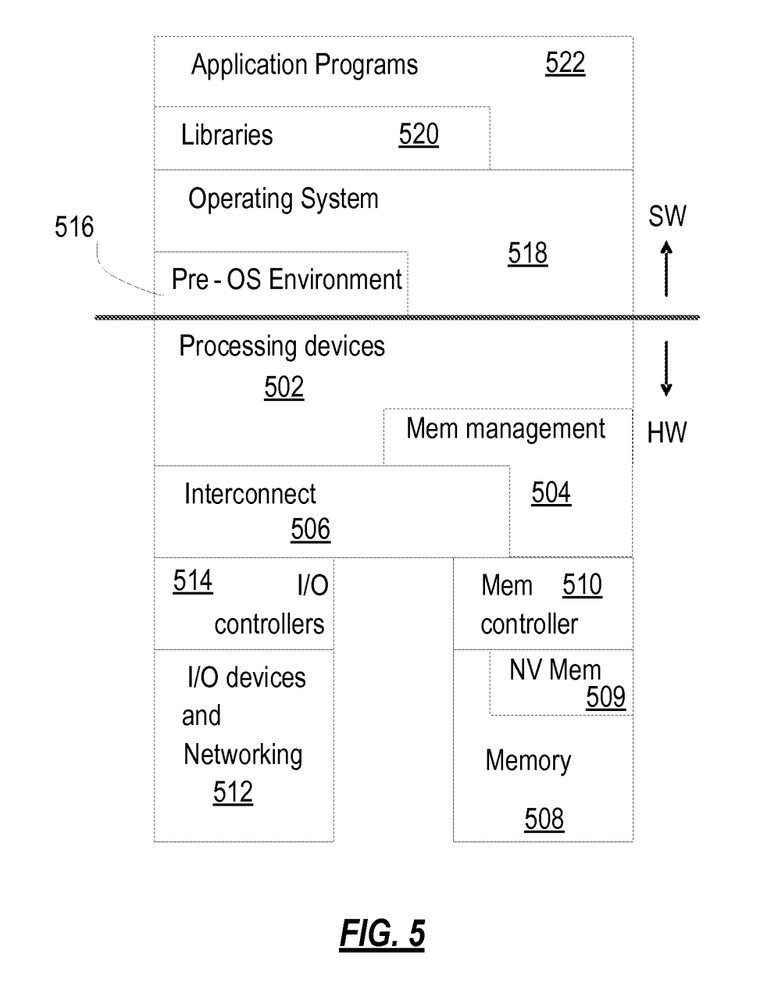
FIG. 5 is a diagram illustrating an exemplary hardware and software architecture of a computer system such as the one depicted in FIG. 4, in which various interfaces between hardware components and software components are shown.

FIG. 5 is a diagram illustrating an exemplary hardware and software architecture of a computer system such as the one depicted in FIG. 4, in which various interfaces between hardware components and software components are shown. As indicated by HW, hardware components are represented below the divider line, whereas software components denoted by SW reside above the divider line. On the hardware side, processing devices 502 (which can include one or more microprocessors, digital signal processors, etc., each having one or more processor cores, are interfaced with memory management device 504 and system interconnect 506. Memory management device 504 provides mappings between virtual memory used by processes being executed, and the physical memory. Memory management device 504 can be an integral part of a central processing unit which also includes the processing devices 502.

Interconnect 506 includes the memory, data, and control busses, as well as the interface with peripherals, e.g., PCI, USB, etc. Memory 508 (e.g., dynamic random access memory—DRAM) and non-volatile memory 509 such as flash memory (i.e., electrically-erasable read-only memory—EEPROM) are interfaced with memory management device 504 and interconnect 506 via memory controller 510. This architecture can support direct memory access (DMA) by peripherals. I/O devices, including video and audio adapters, disk storage, external peripheral busses such as USB, Bluetooth, etc, as well as network interface devices such as those communicating via Ethernet or Wi-Fi interfaces, are collectively represented as I/O devices and networking 512, which interface with interconnect 506 via corresponding I/O controllers 514.

On the software side, a pre-operating system (pre-OS) environment 516, which is executed at initial system start-up and is responsible for initiating the boot-up of the operating system. One traditional example of pre-OS environment 516 is a system basic input/output system (BIOS). In present-day systems, a unified extensible firmware interface (UEFI) is implemented. Pre-OS environment 516, described in greater detail below, is responsible for initiating the launching of the operating system, but also provides an execution environment for embedded applications according to certain aspects of the invention. Operating system 518 provides a kernel that controls the hardware devices, manages memory access for programs in memory, coordinates tasks and facilitates multitasking, organizes data to be stored, assigns memory space and other resources, loads program binary code into memory, initiates execution of the application program which then interacts with the user and with hardware devices, and detects and responds to various defined interrupts. Also, operating system 518 provides device drivers, and a variety of common services such as those that facilitate interfacing with peripherals and networking, that provide abstraction for application programs so that the applications do not need to be responsible for handling the details of such common operations. Operating system 518 additionally provides a graphical user interface (GUI) that facilitates interaction with the user via peripheral devices such as a monitor, keyboard, mouse, microphone, video camera, touchscreen, and the like.

Libraries 520 include collections of program functions that provide further abstraction for application programs. These include shared libraries, dynamic linked libraries (DLLs), for example. Libraries 520 can be integral to the operating system 518, or may be added-on features, or even remotely-hosted. Libraries 520 define an application program interface (API) through which a variety of function calls can be made by application programs to invoke the services provided by the operating system 518. Application programs 522 are those programs that perform useful tasks for users, beyond the tasks performed by lower-level system programs that coordinate the basis operability of the computer system itself.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. In a computing system that includes a processor, data storage, and input/output devices including a network interface device, and an operating system, a method for analyzing effectiveness and accuracy of a file detection rule, the method comprising:

obtaining, by the computing system, the detection rule, wherein the detection rule defines criteria for distinguishing files having at least one characteristic of interest from other files lacking the at least one characteristic of interest;

applying, by the computing system, the detection rule to a set of unknown files, wherein prior to the applying of the detection rule, the at least one characteristic of interest is initially undetermined for each file of the set of unknown files;

wherein as a result of the applying of the detection rule, a result set is generated that contains files detected from among the set of unknown files as having the at least one characteristic of interest and excludes the other files lacking the at least one characteristic of interest;

comparing, by the computing system, each file from the result set to at least one file from a first set of known files known to have the at least one characteristic of interest to produce a first measure of similarity, and to at least one file from a second set of known files known to lack the at least one characteristic of interest to produce a second measure of similarity;
wherein in response to the first measure of similarity exceeding a first similarity threshold, the detection rule is deemed effective; and
wherein in response to the second measure of similarity exceeding a second similarity threshold, the detection rule is deemed inaccurate.

2. The method of claim 1, further comprising, prior to obtaining the detection rule, separating an available set of files into subsets that include the first set of known files, the second set of known files, and the set of unknown files for which the at least one characteristic of interest is unknown.

3. The method of claim 1, wherein in obtaining the detection rule, the detection rule is generated based on the first set of known files.

4. The method of claim 1, wherein in obtaining the detection rule, the at least one characteristic of interest includes a type identifier of an executable file.

5. The method of claim 1, wherein in obtaining the detection rule, the at least one characteristic of interest is associated with maliciousness of the file.

6. The method of claim 1, wherein obtaining the detection rule includes generating, by the computing system, the detection rule.

7. The method of claim 1, wherein obtaining the detection rule includes receiving the detection rule from a remote service that generated the detection rule.

8. The method of claim 1, wherein in comparing each file from the result set to the at least one file from the first set of known files, a combination of file properties are compared selected from the group consisting of: file size, file image size, number of file sections, application programming interface functions, a related virtual address of file sections, a related virtual address of an entry point, respective location of directory table objects, frequency characteristics of symbols, a set of file strings and their quantity, information entropy of a start and the end of a section of the file, a virtual size of the section, physical size of the section, an identifier of a compiler used to create the file, subsystem type, the properties represented in a common object file format header, a location of directory table objects by file sections, or any combination thereof.

9. The method of claim 1, wherein in comparing each file from the result set to the at least one file from the first set of known files and to at least one file from the second set of known files, a plurality of known files having the at least one characteristic of interest and a plurality of known files lacking the at least one characteristic of interest are used for the comparing, wherein each of said pluralities of known files includes a diverse set of file types.

10. The method of claim 1, wherein in comparing each file from the result set to the at least one file from a set of known malicious files, a first known malicious file from the set of known malicious files is used for the comparing, wherein the first known malicious file was used in generating the detection rule.

11. The method of claim 1, wherein in comparing each file from the result set to the at least one file from the first set of known files, a second known file from the first set of known files is used for the comparing, wherein the second known file was not used in generating the detection rule.

12. The method of claim 1, wherein in comparing each file from the result set to the at least one file from a first set of malicious files and to the at least one file from the second set of known files, multiple different file properties are compared, wherein certain file properties are assigned a greater weight than other file properties in computing the first and the second measures of similarity.

13. The method of claim 1, wherein in comparing each file from the result set to the at least one file from the first set of known files and to the at least one file from the second set of known files, the measure of similarity is based on similarity of functionality of compared pairs of files.

14. The method of claim 1, wherein in comparing each file from the result set to the at least one file from the first set of malicious files and to the at least one file from the second set of known files, the measure of similarity is based on a distance computation type selected from the group consisting of: Dice's distance, Hamming distance, Levenstein distance, Jaccard distance, or any combination thereof.

15. The method of claim 1, further comprising:
in response to the detection rule being deemed effective and inaccurate, the result set is subjected to further evaluation, wherein the further evaluation is more computationally expensive than the applying of the detection rule.

16. A system for analyzing effectiveness and accuracy of a file detection rule, comprising:
computing hardware, including a processor, a data storage device, and input/output devices including a network interface device and a graphical user interface;
the data storage device containing a set of unknown files to be analyzed for a presence of malware;
instructions executable on the computing hardware and stored in a non-transitory storage medium that, when executed, cause the computing hardware to implement:
a check module configured to apply a detection rule to each of the files in the set of unknown files, wherein the detection rule defines criteria for distinguishing files having at least one characteristic of interest from other files lacking the at least one characteristic of interest;
wherein as a result of application of the detection rule, the check module is configured to produce a result set that contains files detected from among the set of unknown files as having the at least one characteristic of interest and excludes the other files lacking the at least one characteristic of interest;
an analysis module configured to compare each file from the result set to at least one file from a set of known files having the at least one characteristic of interest to produce a first measure of similarity, and to at least one file from a set of known files lacking the characteristic of interest to produce a second measure of similarity;
wherein in response to the first measure of similarity exceeding a first similarity threshold, the detection rule is deemed effective; and
wherein in response to the second measure of similarity exceeding a second similarity threshold, the detection rule is deemed inaccurate.

17. The system of claim 16, wherein the at least one characteristic of interest is defined based on properties of known malicious files and on properties of known benign files, and wherein the detection rule defines criteria for distinguishing between the malicious files and the benign files.

18. The system of claim 16, wherein the instructions cause the computing hardware to implement a clustering module configured to separate an available set of files into subsets that include the known files having the at least one characteristic of interest, the known files lacking the at least one characteristic of interest, and the set of unknown files.

19. The system of claim 16, wherein the instructions cause the computing hardware to implement a rule creation module configured to generate the detection rule based on a set of the known files having the at least one characteristic of interest.

20. The system of claim 16, wherein the check module is configured to obtain the detection rule from a remote service that generated the detection rule.

21. The system of claim 16, wherein the analysis module is further configured to use a plurality of known files having the at least one characteristic of interest and a plurality of known files lacking the at least one characteristic of interest for the comparing, wherein each of said pluralities of known files includes a diverse set of file types.

22. The system of claim 16, wherein the analysis module is further configured to use a first known file from the set of known files having the at least one characteristic of interest for comparing against each file of the result set, wherein the first malicious file was used in generating the detection rule.

23. The system of claim 16, wherein the analysis module is further configured to use a second known malicious file from the set of known files having the at least one characteristic of interest for comparing against each file of the result set, wherein the second known malicious file was not used in generating the detection rule.

24. The system of claim 16, wherein the analysis module is further configured to compare each file from the result set to the at least one file from a set of known files having the at least one characteristic of interest and to at least one file from the set of known files lacking the at least one characteristic of interest, such that multiple different file properties are compared, wherein certain file properties are assigned a greater weight than other file properties in computing the first and the second measures of similarity.

25. The system of claim 16, wherein the analysis module is further configured to compare each file from the result set to the at least one file from a set of known files having the at least one characteristic of interest and to the at least one file from the set of known files lacking the at least one characteristic of interest, such that the measure of similarity is based on similarity of functionality of compared pairs of files.

26. The system of claim 16, wherein the check module is further configured to perform a further evaluation of the result set in response to the detection rule being deemed effective and inaccurate, wherein the further evaluation of is more computationally expensive than application of the detection rule.

* * * * *